(12) United States Patent
Wang et al.

(10) Patent No.: US 12,149,788 B2
(45) Date of Patent: Nov. 19, 2024

(54) AUTOMATIC IDENTIFICATION OF VIDEO SERIES

(71) Applicant: Lemon Inc., Grand Cayman (KY)

(72) Inventors: He Wang, Culver City, CA (US); James William Burgess, Culver City, CA (US); Robert Roozbeh Maleki, Los Angeles, CA (US); Stephen Niel Boyle, Culver City, CA (US); Karthikeyan Venkatraman, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/747,786

(22) Filed: May 18, 2022

(65) Prior Publication Data

US 2023/0412885 A1    Dec. 21, 2023

(51) Int. Cl.
*H04N 21/466* (2011.01)
(52) U.S. Cl.
CPC ..... *H04N 21/4662* (2013.01); *H04N 21/4667* (2013.01); *H04N 21/4668* (2013.01)
(58) Field of Classification Search
None
See application file for complete search history.

(56) References Cited

U.S. PATENT DOCUMENTS

| | | | | |
|---|---|---|---|---|
| 8,620,919 B2* | 12/2013 | Gates | ...................... | G06F 16/68 |
| | | | | 707/738 |
| 9,165,255 B1* | 10/2015 | Shetty | ................... | G11B 27/00 |
| 9,426,509 B2* | 8/2016 | Ellis | ....................... | H04H 60/72 |
| 10,966,000 B1* | 3/2021 | Robert Jose | ....... | H04N 21/4758 |
| 2006/0195480 A1* | 8/2006 | Spiegelman | ....... | H04N 21/2541 |
| 2007/0288965 A1* | 12/2007 | Murakami | .......... | H04N 21/4663 |
| | | | | 725/46 |
| 2009/0055385 A1* | 2/2009 | Jeon | ..................... | H04N 21/252 |
| | | | | 707/999.005 |
| 2012/0072941 A1* | 3/2012 | Thornberry | .......... | H04N 21/435 |
| | | | | 725/14 |
| 2014/0123163 A1* | 5/2014 | Inkumsah | ............. | G06F 16/958 |
| | | | | 725/14 |
| 2014/0229990 A1* | 8/2014 | Lee | .................... | H04N 21/6547 |
| | | | | 725/46 |
| 2015/0012926 A1* | 1/2015 | Wei | ....................... | G06F 16/735 |
| | | | | 725/9 |

(Continued)

FOREIGN PATENT DOCUMENTS

| | | | | |
|---|---|---|---|---|
| CA | 2696890 A1 * | 2/2009 | ....... | G06F 17/30784 |
| CA | 2882869 A1 * | 3/2014 | ............. | G06F 15/16 |

(Continued)

*Primary Examiner* — William J Kim
(74) *Attorney, Agent, or Firm* — BakerHostetler

(57) ABSTRACT

The present disclosure describes techniques for automatically identifying video series. A first video may be input into a machine learning model. The machine learning model may be trained to identify content that is any part of a connected series. It may be determined whether there is at least a second video in a series with the first video using the machine learning model. The series of videos may comprise the first video and the at least a second video. The series of videos may be uploaded by a same creator. Information indicative of a connection among the series of videos comprising the first video and the at least a second video may be stored.

20 Claims, 13 Drawing Sheets

(56) References Cited

U.S. PATENT DOCUMENTS

| | | | | |
|---|---|---|---|---|
| 2015/0181289 A1* | 6/2015 | Wheatley | H04N 21/4661 | |
| | | | 725/14 | |
| 2015/0365729 A1* | 12/2015 | Kaya | H04N 21/6582 | |
| | | | 725/14 | |
| 2016/0019397 A1* | 1/2016 | Peterson | G06F 21/10 | |
| | | | 726/28 | |
| 2016/0127792 A1* | 5/2016 | Wu | H04N 21/482 | |
| | | | 725/40 | |
| 2016/0150259 A1* | 5/2016 | Sokolov | H04N 21/234309 | |
| | | | 725/27 | |
| 2016/0316280 A1* | 10/2016 | Bulley | H04N 21/8549 | |
| 2016/0360266 A1* | 12/2016 | Wilms | H04N 21/4756 | |
| 2017/0177584 A1* | 6/2017 | Narasimha | H04N 21/8352 | |
| 2018/0005131 A1* | 1/2018 | Yin | G06N 20/00 | |
| 2018/0278351 A1* | 9/2018 | Nakata | H04N 21/44222 | |
| 2019/0273807 A1* | 9/2019 | Mimran | H04L 67/1021 | |
| 2020/0194035 A1* | 6/2020 | Catalano | H04N 21/4667 | |
| 2020/0322684 A1* | 10/2020 | Dong | H04N 21/4668 | |
| 2020/0372073 A1* | 11/2020 | Dahl | G06V 10/82 | |
| 2020/0396497 A1* | 12/2020 | Liu | H04N 21/4826 | |
| 2021/0084375 A1* | 3/2021 | Park | H04N 21/6582 | |
| 2021/0312318 A1* | 10/2021 | Ambrozic | H04N 21/44008 | |
| 2021/0321168 A1* | 10/2021 | Ganuthula | H04N 21/44008 | |

FOREIGN PATENT DOCUMENTS

| | | | | | |
|---|---|---|---|---|---|
| KR | 20200026472 A | * | 3/2020 | | G06F 16/3334 |
| WO | WO-2012173267 A1 | * | 12/2012 | | G06F 17/30849 |
| WO | WO-2018000628 A1 | * | 1/2018 | | |

\* cited by examiner

AUTOMATIC IDENTIFICATION OF VIDEO SERIES

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking, and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Users of content creation platforms may create content that is part of a series. For example, a user of a content creation platform may create a series of videos to be shared on the content creation platform. The series of videos may include more than one video that are intended to be viewed in a particular order. For example, the series of videos may include a first part, a second part, and a third part that sequentially follow each other.

However, users of the content platform that view a particular video belonging to a series may have difficulty finding the other videos that belong to the series. For example, a user of the content platform may watch a video that is "part one" of a series, but the user may have difficulty finding the videos that are "part two," "part three," or "part four" of the series. In some embodiments, the user may watch a video that is "part two" of a series, without being aware that there is a "part one" preceding the "part two." To find other videos that belong to a series, the user may need to spend a large amount of time scrolling through content.

Thus, improvements in content distribution techniques are desirable. In particular, techniques for automatically identifying videos belonging to a series are desirable. Described here are techniques that enable automatic identification of video series. A machine learning model may receive, as input, a first video. The first video may, for example, be a video created by a user of a content platform and uploaded to the content platform for distribution to other users of the content platform. The machine learning model may be trained to identify content that is any part of a connected series. Using the machine learning model, it may be determined whether there are any other videos created by the same user that belong to the same series as the first video.

Figure 1:
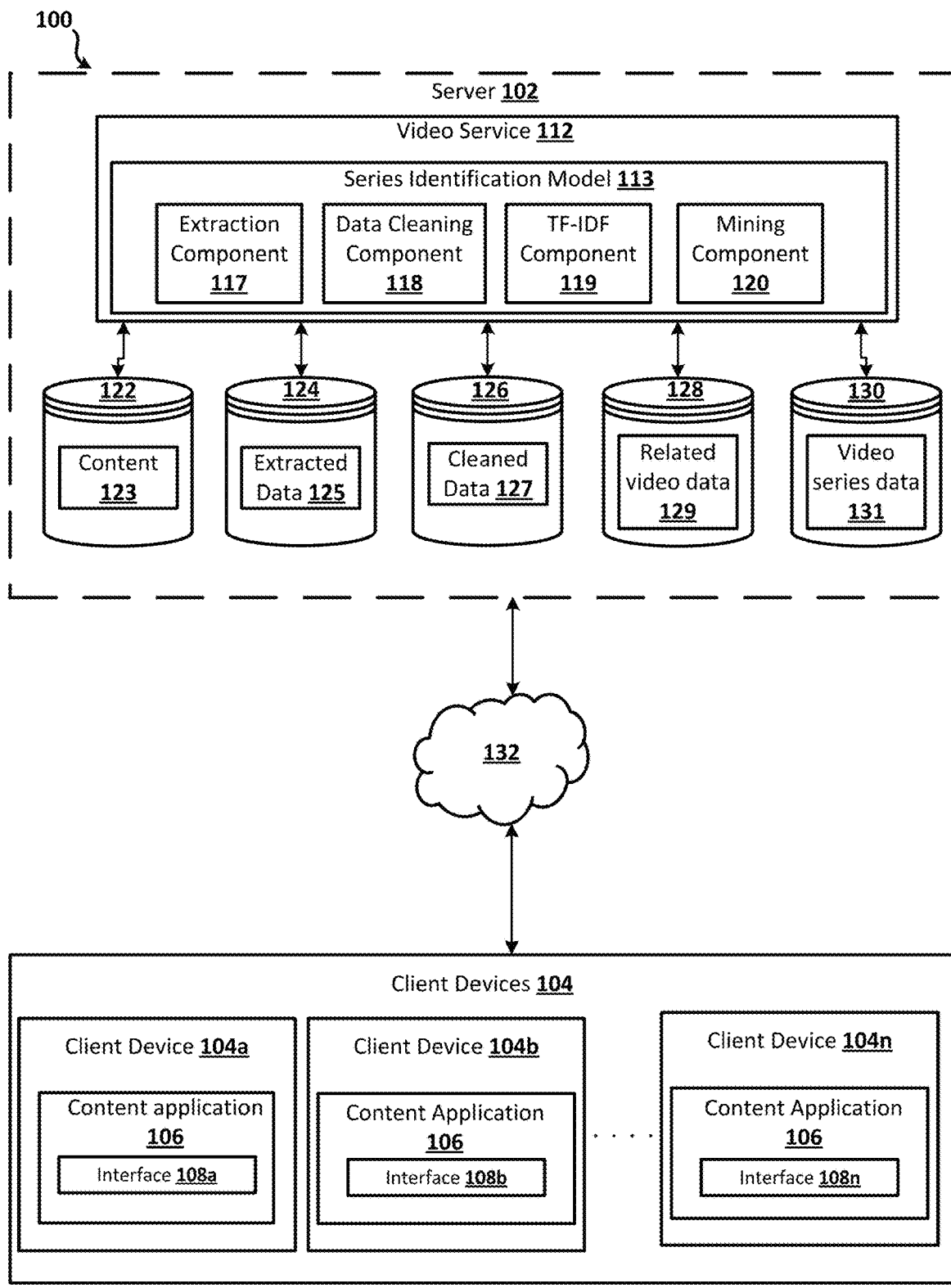
FIG. 1 shows an example system for distributing content which may be in accordance with the present disclosure.

The techniques for automatically identifying video series described herein may be utilized by a system for distributing content. FIG. 1 illustrates an example system 100 for distributing content. The system 100 may comprise a server 102 and a plurality of client devices 104. The server 102 and the plurality of client devices 104a-n may communicate with each other via one or more networks 132.

The server 102 may be located at a data center, such as a single premise, or be distributed throughout different geographic locations (e.g., at several premises). The server 102 may provide the services via the one or more networks 120. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may comprise a plurality of computing nodes that host a variety of services. In an embodiment, the nodes host a video service 112. The video service 112 may comprise a content streaming service, such as an Internet protocol video streaming service. The video service 112 may be configured to distribute content 123 via a variety of transmission techniques. The video service 112 is configured to provide the content 123, such as video, audio, textual data, a combination thereof, and/or the like. The content 123 may comprise content streams (e.g., video stream, audio stream, information stream), content files (e.g., video file, audio file, text file), and/or other data. The content 123 may be stored in a database 122. For example, the video service 112 may comprise a video sharing service, a video hosting platform, a content distribution platform, a collaborative gaming platform, and/or the like.

In an embodiment, the content 123 distributed or provided by the video service 112 comprises videos. The videos may have a duration less than or equal to a predetermined time limit, such as one minute, five minutes, or other predetermined minutes. By way of example and without limitation, the videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, pulling pranks, or giving advice, such as beauty and fashion advice, cooking tips, or home renovation tips.

In an embodiment, the content 123 may be output to different client devices 104 via the network 132. The content 123 may be streamed to the client devices 104. The content stream may be a stream of videos received from the video service 112. The plurality of client devices 104 may be configured to access the content 123 from the video service 112. In an embodiment, a client device 104 may comprise a content application 106. The content application 106 outputs (e.g., display, render, present) the content 123 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the server 102. The plurality of client devices 104 may travel to a variety of locations and use different networks to access the server 102.

The video service 112 may be configured to receive input from users. The users may be registered as users of the video service 112 and may be users of the content application 106 operating on client devices 104. The user inputs may include videos created by users, user comments associated with videos, or "likes" associated with videos. The user inputs may include connection requests and user input data, such as text data, digital image data, or user content. The connection requests may comprise requests from the client devices 104a-d to connect to the video service 112. The user input data may include information, such as videos and/or user comments, that the users connected to the video service 112 want to share with other connected users of the video service 112.

The video service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" videos or comments written by other users. In another example, a user using the content application 106 on a smart television, laptop, desktop, or gaming device may not be able to create and upload videos or comment on videos using the content application 106. Instead, the user using the content application 106 on a smart television, laptop, desktop, or gaming device may only be able to use the content application 106 to view videos, view comments left by other users, and "like" videos.

In an embodiment, a user may use the content application 106 on a client device 104 to create a video, such as a short video, and upload the video to the server 102. The client devices 104 may access an interface 108 of the content application 106. The interface 108 may comprise an input element. For example, the input element may be configured to allow users to create the video. To create the short video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. The user may add one or more texts, filters, sounds, or effects, such as beauty effects, to the video. To add a pre-recorded audio overlay to the video, the user may select a song or sound clip from a sound library of the content application 106. The sound library may include different songs, sound effects, or audio clips from movies, albums, and television shows. In addition to or in lieu of adding a pre-recorded audio overlay to the video, the user may use the content application 106 to add a voice-over to the video. The voice-over may be a sound recorded by the user using a microphone of the client device 104. The user can add a text overlay to the short video and may use the content application 106 to specify when they want the text overlay to appear in the video. The user may assign a caption, location tag, and one or more hashtags to the video to indicate the subject matter of the video. The content application 106 may prompt the user to select a frame of the video to use as a "cover image" for the video.

After the user has created the video, the user may use the content application 106 to upload the video to the server 102 and/or to save the video locally to the user device 104. When a user uploads the video to the server 102, they may choose whether they want the video to be viewable by all other users of the content application 106 or viewable by only a subset of the users of the content application 106. The video service 112 may store the uploaded videos and any metadata associated with the videos in one or more databases 122.

In an embodiment, a user may use the content application 106 on a client device 104 to provide input on a video. The client devices 104 may access an interface 108 of the content application 106 that allows users to provide input associated with videos. The interface 106 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The video service 112 may store the input and associated metadata in a database 122.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

As discussed above, a user may use the content application 106 on a client device 104 to create a video and upload the video to the server 102. In an embodiment, the video created by the user via the content application 106 on the client device 104 may be a video that does not comprise a pre-recorded audio overlay, such as a clip of a pre-recorded song or audio from a television show or movie. Instead, music may be automatically generated for the video after the user has created the video. For example, music may be automatically generated for the video locally on the client device 104 after the user has created the video but before the user has uploaded the video to the server 102.

In embodiments, a user may use the content application 106 on a client device 104 to create a series of videos, such as a series of short videos, and upload the series of videos to the server 102. The client devices 104 may access an interface 108 of the content application 106. The interface 108 may comprise an input element. For example, the input element may be configured to allow users to create the series of videos. To create the series of videos, the user may give the content application 106 permission to access an image capture device, such as a camera, or a microphone of the client device 104.

A series of videos may comprise a plurality of related videos. For example, a series of videos may comprise a plurality of related videos that are intended to be watched in a particular order. The plurality of related videos may be created by the same user. The plurality of related videos may be created substantially at the same time. For example, a user may use the content application 106 on a client device 104 to create a first video in a series of videos, then may immediately use the content application 106 on a client device 104 to create a second video in the same series of videos. Alternatively, the plurality of related videos may not be created substantially at the same time. For example, a user may use the content application 106 on a client device 104 to create a first video in a series of videos, then may wait some period of time (i.e., a minute, an hour, a day, a week, etc.) before using the content application 106 on a client device 104 to create a second video in the same series of videos.

In an embodiment, at least one of the video service 112 or the client devices 104 comprises a series identification model 113. The series identification model 113 may be configured to automatically determine video series. For example, when a new video is uploaded to the video service 112, the series identification model 113 may be configured to automatically identify other videos, if any, that belong to the same series as the newly uploaded video. The series identification model 113 may, for example, comprise an extraction component 117, a data cleaning component 118, a frequency-inverse document frequency (TF-IDF) component 119, and/or a mining component 120. For example, if a user uploads a new video to the video service 112, the series identification model 113 may input the new video into the extraction component 117.

In embodiments, the extraction component 117 may be utilized, at least in part, to retrieve information from videos created and/or uploaded by users. For example, the extraction component 117 may be utilized to extract information, such as data and/or metadata, associated with the text associated with a video. The text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words. The text information extracted from the user-created videos by the extraction component 117 may, for example, be stored in a database 124 as extraction data 125.

In embodiments, the extraction component 117 may additionally or alternatively be configured to extract information, such as data and/or metadata, associated with the images associated with a video. For example, the extraction component 117 may perform image recognition on the frames of the video to determine the content included in the video frames. For example, if a video depicts a dog, the extraction component 117 may perform image recognition on the frames of the video to determine that one or more frames of the video depict a dog. Data and/or metadata indicating that the video depicts a dog may be extracted by the extraction component 117 and stored in the database 124 as extraction data 125.

In embodiments, the extraction component 117 may additionally or alternatively be configured to extract information, such as data and/or metadata, associated with the audio or subtitles associated with a video. For example, the extraction component 117 may perform speech recognition on the audio of the video to determine the words being spoken or sung in the video. For example, if a video depicts a man telling a story, the extraction component 117 may perform speech recognition on the audio of the video to determine text that corresponds to the audio. Data and/or metadata indicating the text that corresponds to the audio may be stored in the database 124 as extraction data 125.

In embodiments, the data cleaning component 118 may be utilized, at least in part, to clean the extraction data 125. For example, the data cleaning component 118 may be configured to retrieve the extraction data 125 and prepare the extraction data 125 for natural language processing. For example, the data cleaning component 118 may remove symbols (i.e., @username), remove non-alphanumeric characters, convert uppercase text to lowercase text, convert video text and sticker text to words, and/or extract labels from the extraction data 125. Labels may include key words that indicate the video may be part of a series, such as "part," "pt.," "episode," "ep.," etc. The cleaned extraction data may, for example, be stored in a database 126 as cleaned data 127.

In an embodiment, at least one of the video service 112 or the client devices 104 comprises a frequency-inverse document frequency (TF-IDF) component 119. TF-IDF is a numerical statistic that reflects how important a word is to a document or video in a collection or corpus. It may be used as a weighting factor in searches of information retrieval, text mining, and user modeling. The TF-IDF component 119 may be utilized, at least in part, to determined related videos based on the cleaned data 127. The related video data may, for example, be stored in a database 128 as related video data 129.

In embodiments, the TF-IDF component 119 may be configured to determine how frequently a word or term occurs in the cleaned data 127 and to determine how frequently that same word or term occurs in in a collection or corpus, such as in all videos uploaded to the video service 112. It may be determined that a word or term is more unique and/or is important to a particular video if the word or term is used frequently in the video and infrequently in all other videos uploaded to the video service 112.

For example, a video may contain the words "the" and "bobsledding." The TF-IDF component 119 may be configured to determine how frequently the words "the" and "bobsledding" occur in the cleaned data 127 associated with the video. The TF-IDF component 119 may also be configured to determine how frequently the words "the" and "bobsledding" occur in all videos uploaded to the video service 112. The TF-IDF component 119 may determine that the word "bobsledding" is more unique and/or is important to the video because the word "bobsledding" is used frequently in the video and infrequently in all other videos uploaded to the video service 112. Conversely, the TF-IDF component 119 may determine that the word "the" is not important to the video because, despite the word "the" being used frequently in the video, the word "the" is also used frequently in a large percentage of other videos uploaded to the video service 112.

The TF-IDF component 119 may be configured to determine other videos related to a first video based on cosine similarity distance between the first video and other videos uploaded to the video service 112 by the same user that uploaded the first video. The TF-IDF component 119 may, for the first video and each of the other videos uploaded to the video service 112 by the same user that uploaded the first video, determine a vector of TF-IDF tokens. The vector of TF-IDF tokens associated with a particular video may indicate the terms and/or words that are more unique and/or important to that particular video. The TF-IDF component 119 may determine the cosine similarity distance between the vector of TF-IDF tokens associated with the first video and the vectors of TF-IDF tokens associated each of the other videos to determine which of the other videos are related to the first video. The related video data may, for example, be stored in a database 128 as related video data 129.

The mining component 120 may be configured to determine which of the videos that are related to a video, if any, are likely connected in a series to the video. For example, the mining component 120 may be configured to retrieve the related video data 129 from the database 128. The mining component 120 may utilize the related video data 129 to determine which of the videos that are related to a video, if any, are likely connected in a series to the video. For example, the mining component 120 may utilize the video labels associated with the related videos to determine which of the related videos, if any, are likely connected in a series to the video. For example, if a first video includes a label "part one," the mining component 120 may determine that a related video including the label "part two" is likely connected in a series to the first video.

The mining component 120 may additionally explore video linkage based on the labels and/or the create times of the videos. For example, if two videos include labels that indicate that the two videos are connected in a series, the mining component may determine a create time associated with each of the two videos to determine which of the two videos is intended to be watched first. For example, if one of the two videos was created at noon on Jul. 1, 2021, and the other of the two videos was created at 1 pm on Jul. 1, 2021, the mining component 120 may determine that the video created at noon is intended to be watched before the video created at 1 pm. Thus, the video created at noon may come before the video created at 1 pm in the series.

The video series data may, for example, be stored in a database 130 as video series data 131. The series identification model 113 may output the video series data 131. In embodiments, the video series data 131 may be stored in the database 130 in the form of one or more playlists, with each playlist corresponding to a particular video series. Each playlist may comprise identification information of the videos in the corresponding series. The playlist may additionally indicate the order of the videos in the corresponding series. For example, the playlist may indicate the order in which the videos in the corresponding series are intended to be watched. Such a playlist may be automatically sent or pushed to an interface 108 of a client device 104 when whenever a user views a video that is part of the playlist. In other words, when a user views a video that is part of a series, the related videos in the series are automatically presented to and/or recommended to the user for consumption. In this manner, creators do not need to manually tag, link, or surface related content from a series to their audience.

Figure 2:
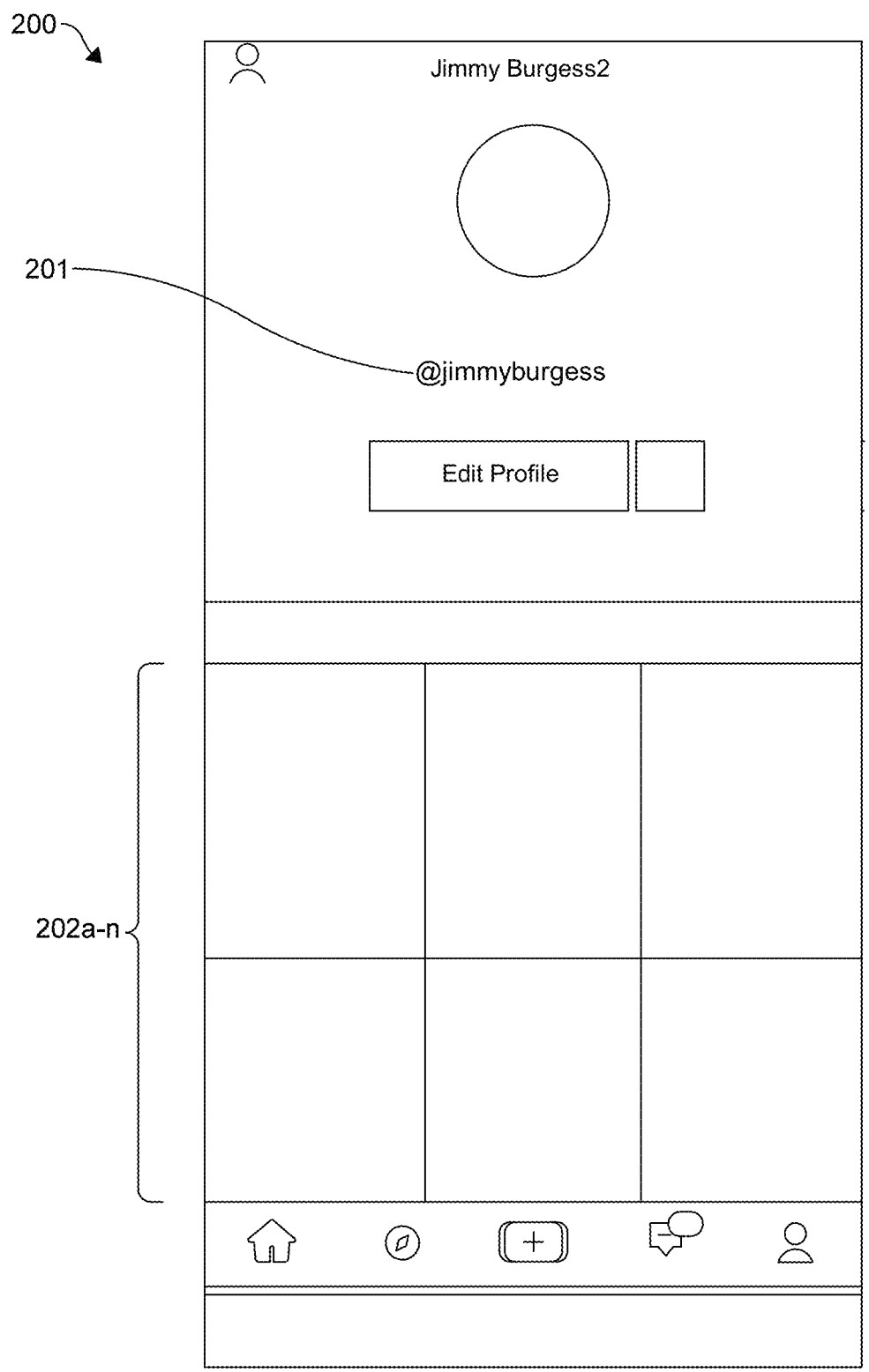
FIG. 2 shows an example user interface which may be in accordance with the present disclosure.

FIG. 2 shows an example user interface (UI) 200 which may be in accordance with the present disclosure. The UI 200 depicts a user profile associated with the video service 112. For example, the user profile may be associated with a registered user of the video service 112. The registered user may be associated with a username 201 depicted on the user profile. The user profile may depict thumbnails 202a-n of all videos created by the user and uploaded to the video service 112. One or more of the videos represented by the thumbnails 202a-n may be connected in series to each other. The user may have uploaded any number of videos to the video service. Accordingly, any number of thumbnails may be depicted by the user profile.

Figure 3:
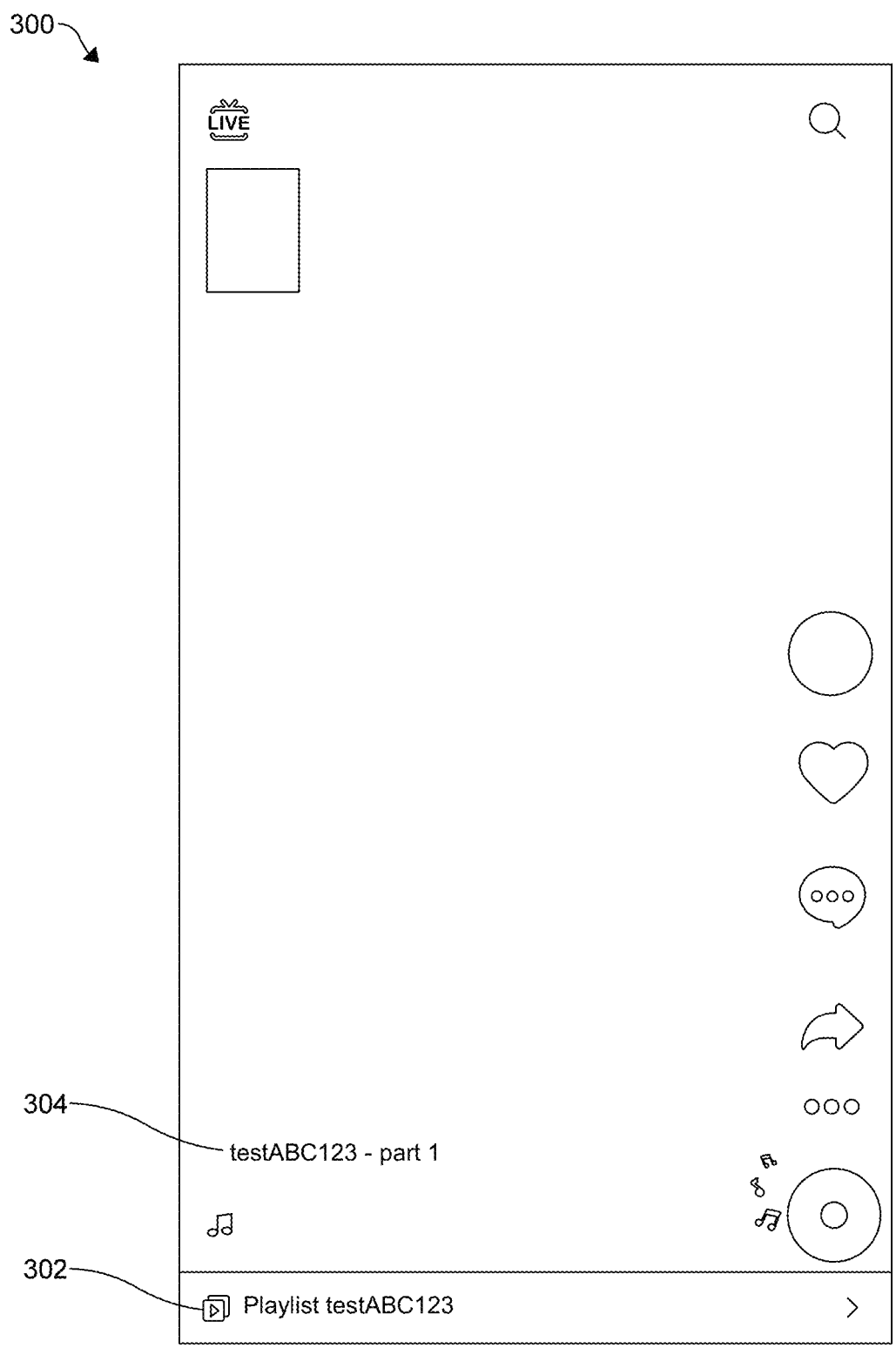
FIG. 3 shows another example user interface which may be in accordance with the present disclosure.

Other users of the video service 112 may select a particular thumbnail from the thumbnails 202a-n to view the corresponding video. For example, if another user of the video service 112 selects a thumbnail 202a-n, a video that belongs to a series of videos may be output. FIG. 3 shows an example UI 300 which may be in accordance with the present disclosure. The UI 300 depicts a frame of a video being output. The video being output may, for example, correspond to one of the thumbnails 202a-n. The UI 300 may depict a caption 304 corresponding to the video being output. The caption 304 may indicate that the video being output is part of a series of videos. For example, the caption 304 may include text that indicates "part one" "pt. 1," "episode one," etc.

The UI 300 may additionally include a playlist button 302 that indicates that the video being output belongs to a series. If the user viewing output of the video selects the playlist button 302, the user may be directed to a playlist that indicates all videos in the series. The playlist may have been automatically generated in the above-described manner when the creator of the videos (i.e., the registered user associated with the username 201) uploaded the videos to the video service 112. For example, the playlist may have been automatically generated by the series identification model 113. In this manner, the registered user associated with the username 201 does not need to manually tag, link, or surface related content from the series to his or her audience.

Figure 4:
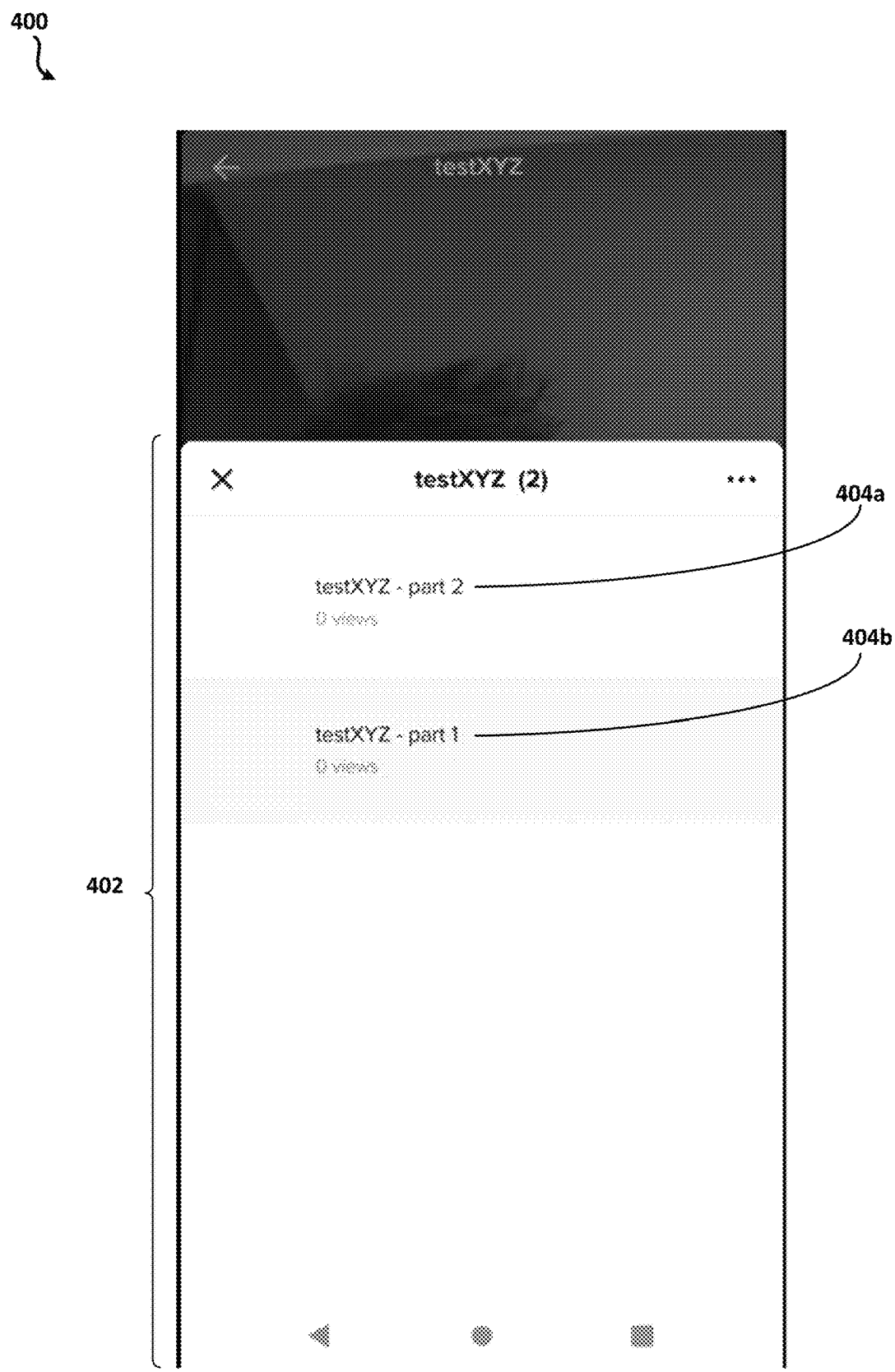
FIG. 4 shows another example user which may be in accordance with the present disclosure.
Figure 5:
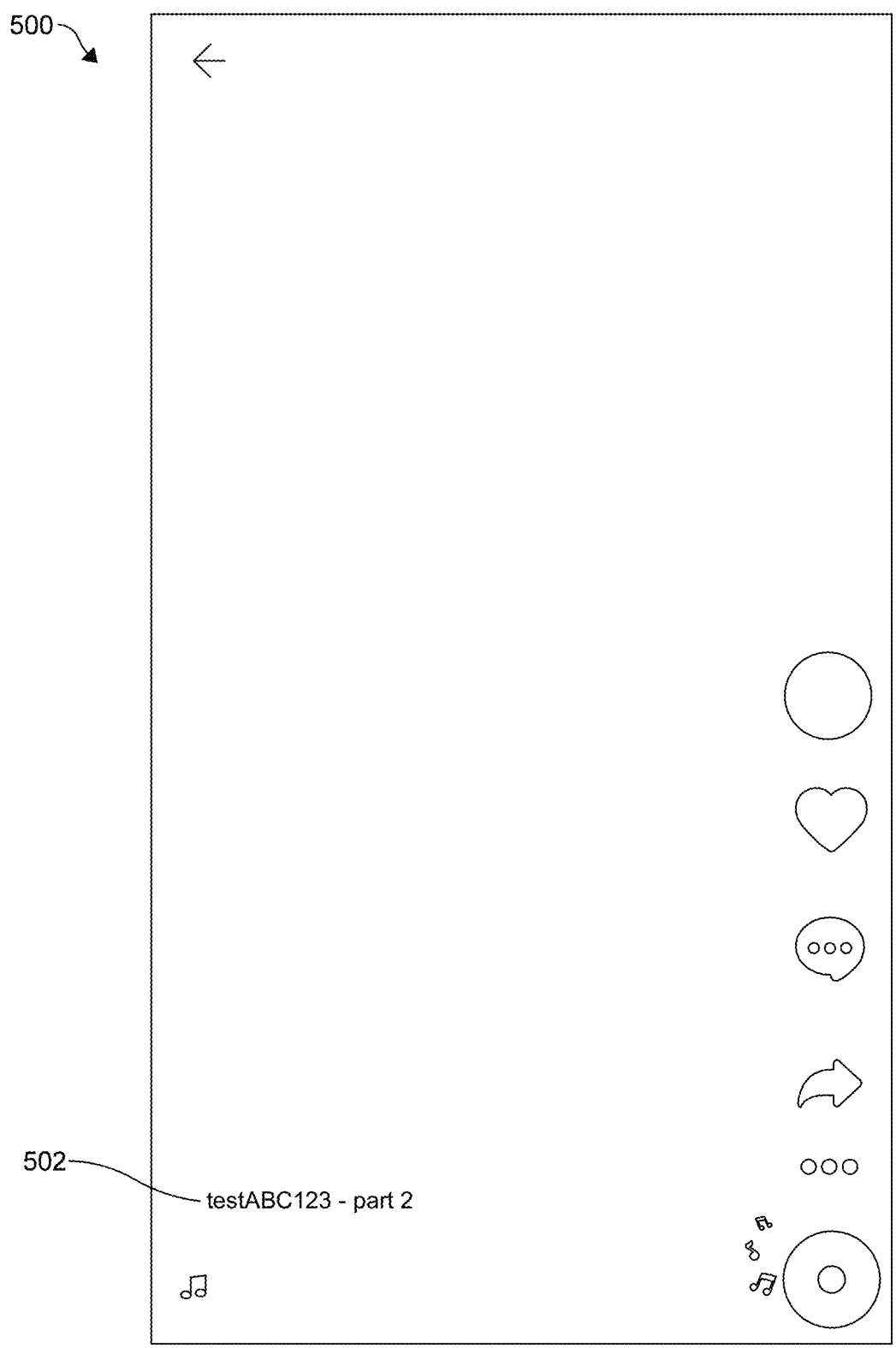
FIG. 5 shows another example user interface which may be in accordance with the present disclosure.

FIG. 4 shows an example UI 400 which may be in accordance with the present disclosure. The UI 400 depicts a playlist 402. The playlist 402 indicates that the video being output (such as on the UI 300) is part of a playlist that contains two videos. For example, the playlist 402 includes a first indication 404a that corresponds to the video being output (such as on the UI 300), and a second indication 404b that corresponds to another video related in series to the video being output. If the user viewing the video being output selects a video in the playlist 402, the selected video may begin to be output to the user. For example, if the user selects the indication 404b, the other video in the series may be output for consumption by the user. In this manner, the user may be able to view the other videos in the series without needing to scroll through the creator's profile. For example, the UI 500 depicted by FIG. 5 may be output to the user. The UI 500 depicts a frame of the other video being output to the user. As indicated by the caption 502 of the other video, this other video is "part 2" of the series, with the video output on the UI 300 being "part 1" of the same series.

Figure 6:
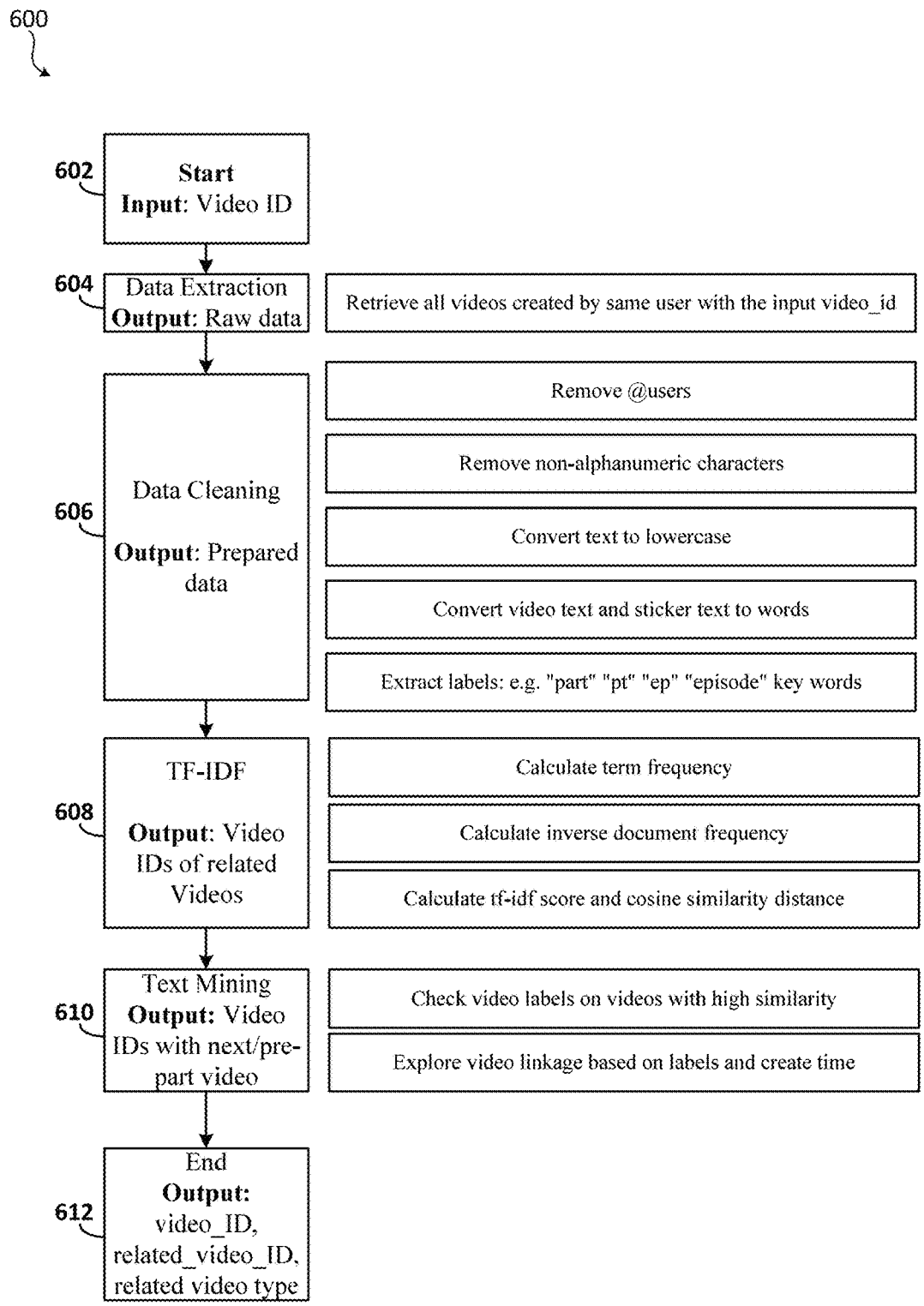
FIG. 6 shows an example diagram depicting a process for automatic identification of video series which may be in accordance with the present disclosure.

FIG. 6 shows an example diagram 600 depicting a process for automatic identification of video series, which may be in accordance with the present disclosure. At 602, a video may be input into a machine learning model (i.e., the series identification model 113). The machine learning model may be trained to identify content that is any part of a connected series The video may, for example, be a video that was just created and uploaded to a video service (i.e., video service 112). Alternatively, the video may be a video that was created and uploaded to the video service in the past, such as yesterday, last week, last month, etc.

At 604, data and/or metadata may be extracted from the video and from all other videos created by the same user (i.e., all videos associated with the same input video ID). For example, data and/or metadata may be extracted from the videos by the machine learning model, such as via an extraction component (i.e., extraction component 117) of the model. Data and/or metadata associated with the text of the videos may be extracted. The text associated with the videos may include, by way of example and without limitation, a username associated with the videos, a caption associated with the videos, one or more hashtags associated with the videos, and/or stickers featured in the videos. As described above, a sticker may be an image, graphic, GIF, etc. that a user has superimposed on top of a video. The image may feature one or more letters or words. In embodiments, the data and/or metadata associated with the images and/or the audio of the videos may additionally, or alternatively, be extracted.

At 606, the extracted data/metadata may be cleaned. For example, the extracted data and/or metadata may be cleaned by the machine learning model, such as via a cleaning component (i.e., cleaning component 118) of the model. Cleaning the extracted data/metadata may comprise preparing the extracted data/metadata for natural language processing. For example, symbols (i.e., @username) and/or non-alphanumeric characters may be removed from the extracted data/metadata, uppercase text may be converted to lowercase text, video text and sticker text may be converted to words, and/or labels may be extracted from the extracted data and/or metadata. As described above, labels may include key words that indicate the video may be part of a series, such as "part," "pt.," "episode," "ep.," etc.

At 608, related videos may be determined at least in part on the cleaned data. For example, the related videos may be determined by the machine learning model, such as via a TF-IDF component (i.e., TF-IDF component 119) of the model. In embodiments, the TF-IDF component 119 may be configured to determine how frequently a word or term occurs in the cleaned data for each video and to determine how frequently that same word or term occurs in in a collection or corpus, such as in all videos uploaded to the video service 112. It may be determined that a word or term is more unique and/or is important to a particular video if the word or term is used frequently in the video and infrequently in all other videos uploaded to the video service 112.

Related videos, if any, may be determined based on cosine similarity distance between the videos. For example, the TF-IDF component may, for each of the videos, determine a vector of TF-IDF tokens. The vector of TF-IDF tokens associated with a particular video may indicate the terms and/or words that are more unique and/or important to that particular video. The TF-IDF component may determine the cosine similarity distance between all of the vectors of TF-IDF tokens to determine related videos.

At 610, it may be determined which, if any, of the related videos are likely connected in a series. For example, it may be determined which, if any, of the related videos are likely connected in a series by the machine learning model, such as via a mining component (i.e., mining component 120) of the model. For example, the mining component may utilize the video labels associated with the related videos to determine which of the related videos, if any, are likely connected in a series to the video. For example, if a first video includes a label "part one," the mining component may determine that a related video including the label "part two" is likely connected in a series to the first video.

The mining component may additionally explore video linkage based on the labels and/or the create times of the videos. For example, if two videos include labels that indicate that the two videos are connected in a series, the mining component may determine a create time associated with each of the two videos to determine which of the two videos is intended to be watched first. For example, if one of the two videos was created at noon on Jul. 1, 2021, and the other of the two videos was created at fpm on Jul. 1, 2021, the mining component 120 may determine that the video created at noon is intended to be watched before the video created at fpm. Thus, the video created at noon may come before the video created at fpm in the series.

At 612, the machine learning model may output a dictionary of output data if the model found any relationship between the videos. The output video may indicate an ID of a first video, an ID of a second video that is related to the first video, and a type. The type may indicate whether the second video is the next part of the first video, the previous part of the input video, and/or is a recommend video. The second video may be a recommended video if it is related to the first video in some manner, but the model cannot predict with high confidence if the second video is intended to be watched before or after the first video. A particular video may be related in series to more than one other video. Alternatively, the machine learning model may output an empty dictionary if none of the videos were determined to be part of a series.

As described above, a playlist may be generated based on such output data in the dictionary. The playlist may indicate, for each video in the playlist, whether it is the next video in the series or the previous video in the series if the similarity/confidence scores are high (i.e., satisfy a threshold). If the similarity/confidence scores are not high (i.e., do not satisfy a threshold), the playlist may indicate that the videos in the playlist are other videos that viewers may be interested in, without necessarily indicating the order of those videos in a series.

Figure 7:
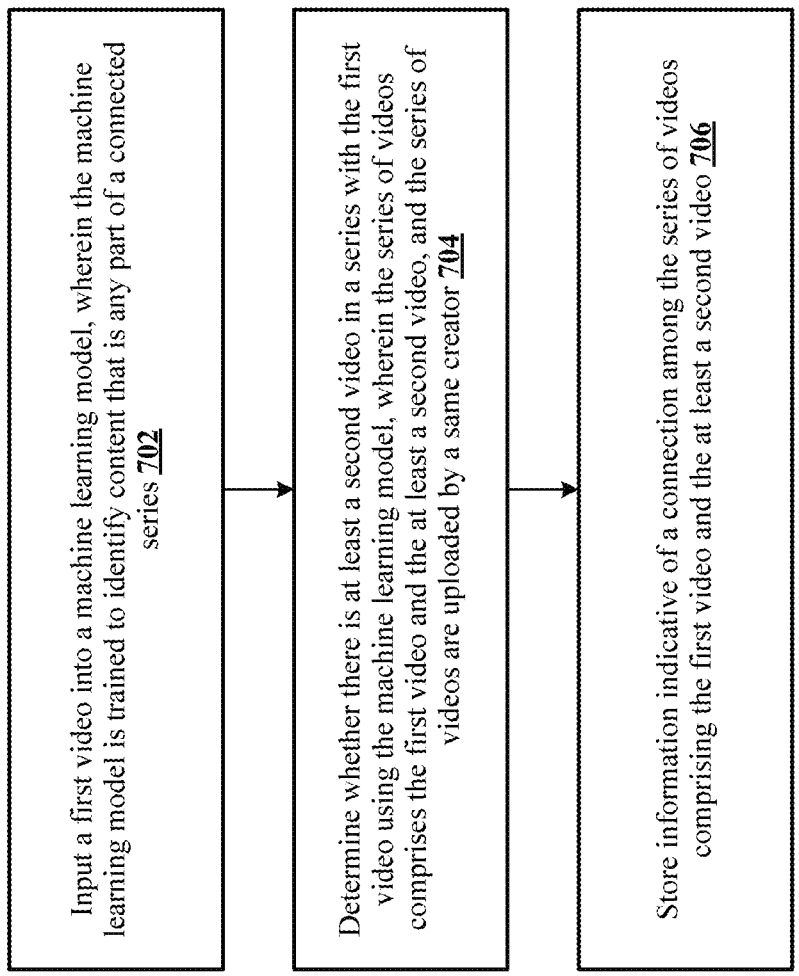
FIG. 7 shows an example method for automatically identifying video series which may be in accordance with the present disclosure.

FIG. 7 illustrates an example process 700 performed by a video service (e.g., video service 112) and/or a client device (e.g., client device 104). The video service and/or the client device may perform the process 700 automatically generate music for videos. Although depicted as a sequence of operations in FIG. 7, those of ordinary skill in the art will appreciate that various embodiments may add, remove, reorder, or modify the depicted operations.

At 702, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 704, it may be determined whether there is at least a second video in a series with the first video using the machine learning model. The series of videos may comprise the first video and the at least a second video. The series of videos may be uploaded by a same creator.

The machine learning model may, for example, comprise an extraction component, a data cleaning component, a frequency-inverse document frequency (TF-IDF) component, and/or a mining component. The extraction component may extract information, such as data and/or metadata, associated with the text, images, audio and/or subtitles associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for each video and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 706, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series.

Figure 8:
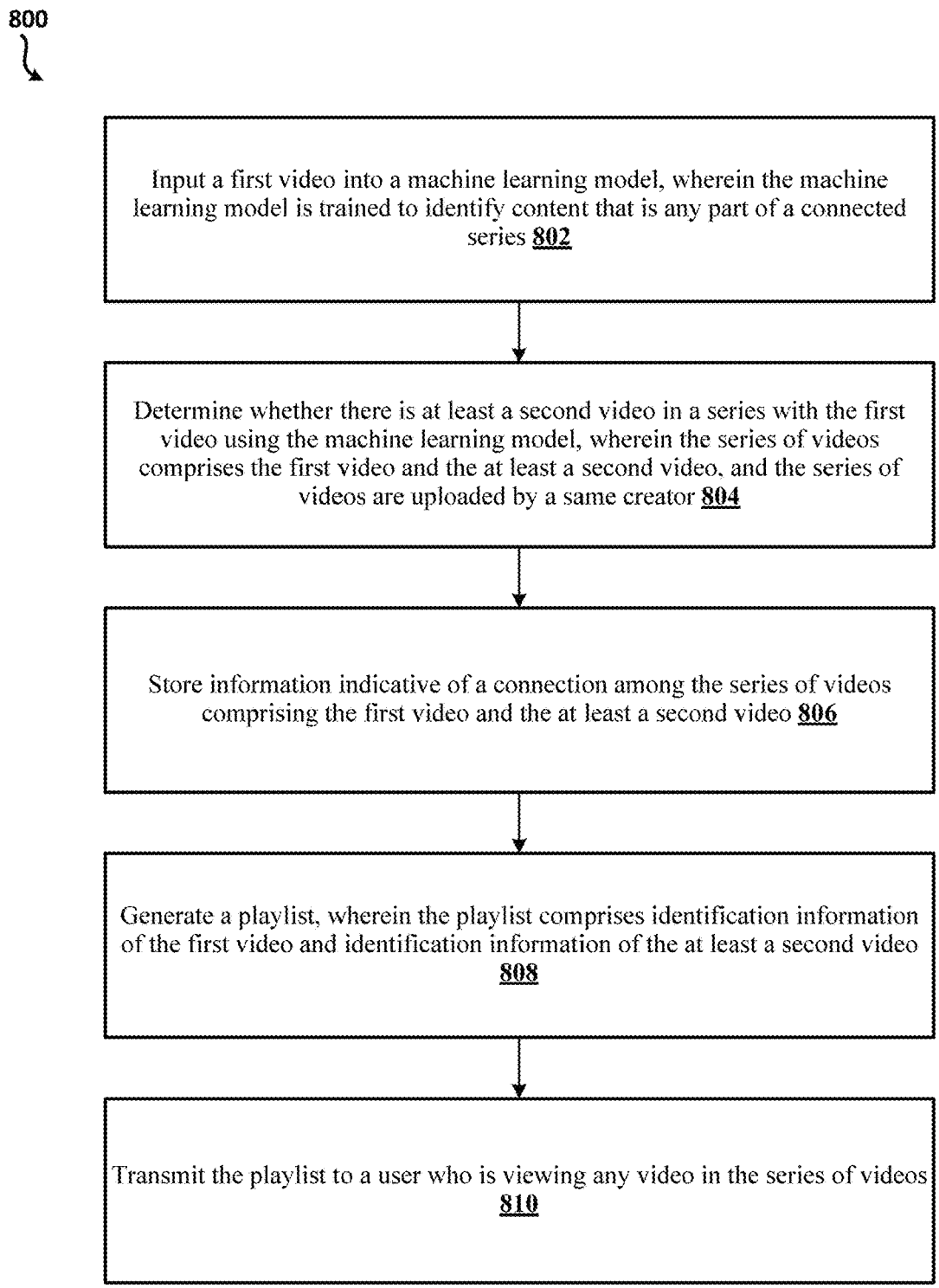
FIG. 8 shows another example method for automatically identifying video series which may be in accordance with the present disclosure.

FIG. 8 illustrates an example process 800 performed by a video service (e.g., video service 112) and/or a client device (e.g., client device 104). The video service and/or the client device may perform the process 800 automatically generate music for videos. Although depicted as a sequence of operations in FIG. 8, those of ordinary skill in the art will appreciate that various embodiments may add, remove, reorder, or modify the depicted operations.

At 802, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 804, it may be determined whether there is at least a second video in a series with the first video using the machine learning model. The series of videos may comprise the first video and the at least a second video. The series of videos may be uploaded by a same creator.

The machine learning model may, for example, comprise an extraction component, a data cleaning component, a frequency-inverse document frequency (TF-IDF) component, and/or a mining component. The extraction component may extract information, such as data and/or metadata, associated with the text, images, audio and/or subtitles associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for each video and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 806, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series.

At 808, a playlist may be generated. The playlist may comprise identification information of the first video and identification information of the at least a second video. For example, the playlist may correspond to the series of videos and may comprise identification information or each video in the series of videos. The playlist may additionally indicate the order of the videos in the series of videos. For example, the playlist may indicate the order in which the videos in the series of videos are intended to be watched.

At 820, the playlist may be transmitted to a user who is viewing any video in the series of videos. For example, the playlist may be automatically sent or pushed to an interface of a client device when whenever a user views a video that is part of the playlist. In other words, when a user views a video that is part of a series, the related videos in the series are automatically presented to and/or recommended to the user for consumption. In this manner, creators do not need to manually tag, link, or surface related content from a series to their audience.

Figure 9:
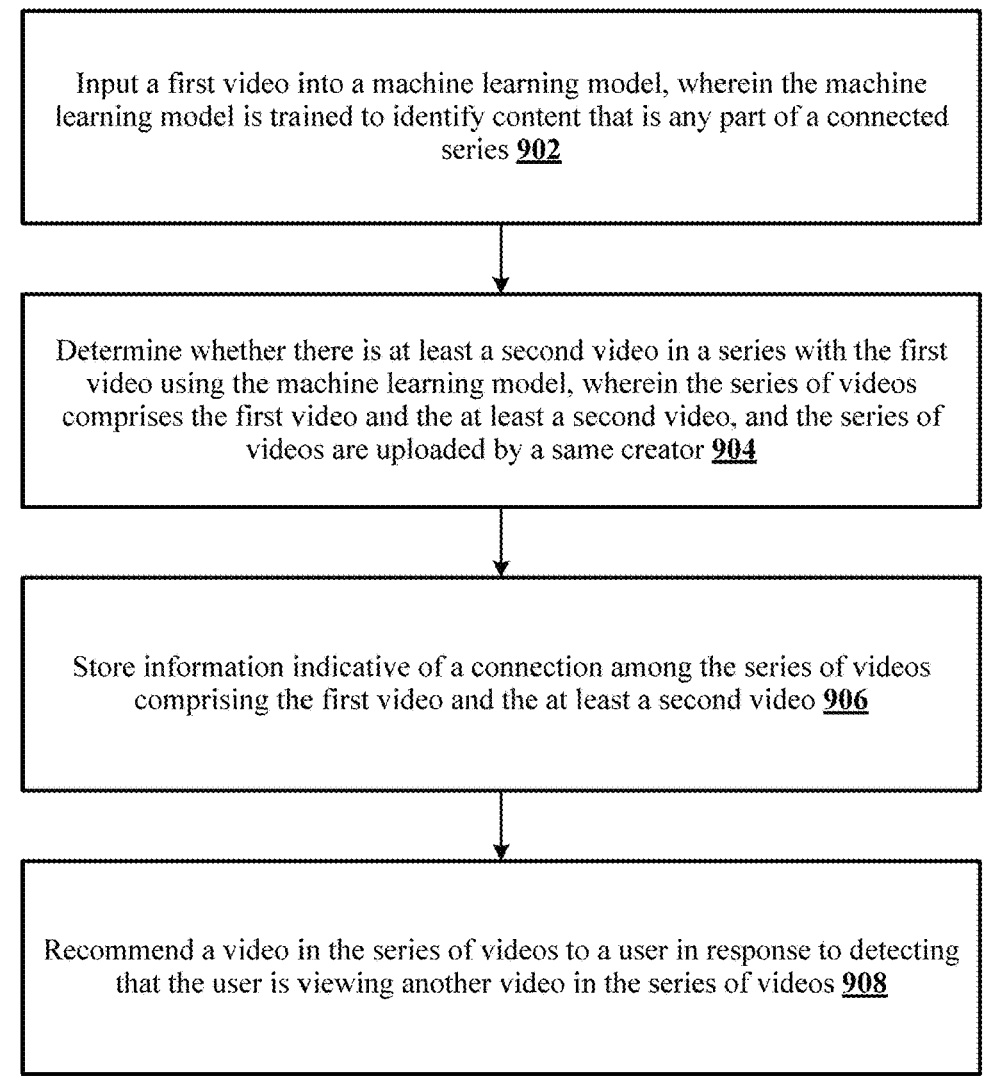
FIG. 9 shows another example method for automatically identifying video series which may be in accordance with the present disclosure.

FIG. 9 illustrates an example process 900 performed by a video service (e.g., video service 112) and/or a client device (e.g., client device 104). The video service and/or the client device may perform the process 900 automatically generate music for videos. Although depicted as a sequence of operations in FIG. 9, those of ordinary skill in the art will appreciate that various embodiments may add, remove, reorder, or modify the depicted operations.

At 902, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 904, it may be determined whether there is at least a second video in a series with the first video using the machine learning model. The series of videos may comprise the first video and the at least a second video. The series of videos may be uploaded by a same creator.

The machine learning model may, for example, comprise an extraction component, a data cleaning component, a frequency-inverse document frequency (TF-IDF) component, and/or a mining component. The extraction component may extract information, such as data and/or metadata, associated with the text, images, audio and/or subtitles associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for each video and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 906, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series. At 908, a video in the series of videos may be recommended to a user in response to detecting that the user is viewing another video in the series of videos.

Figure 10:
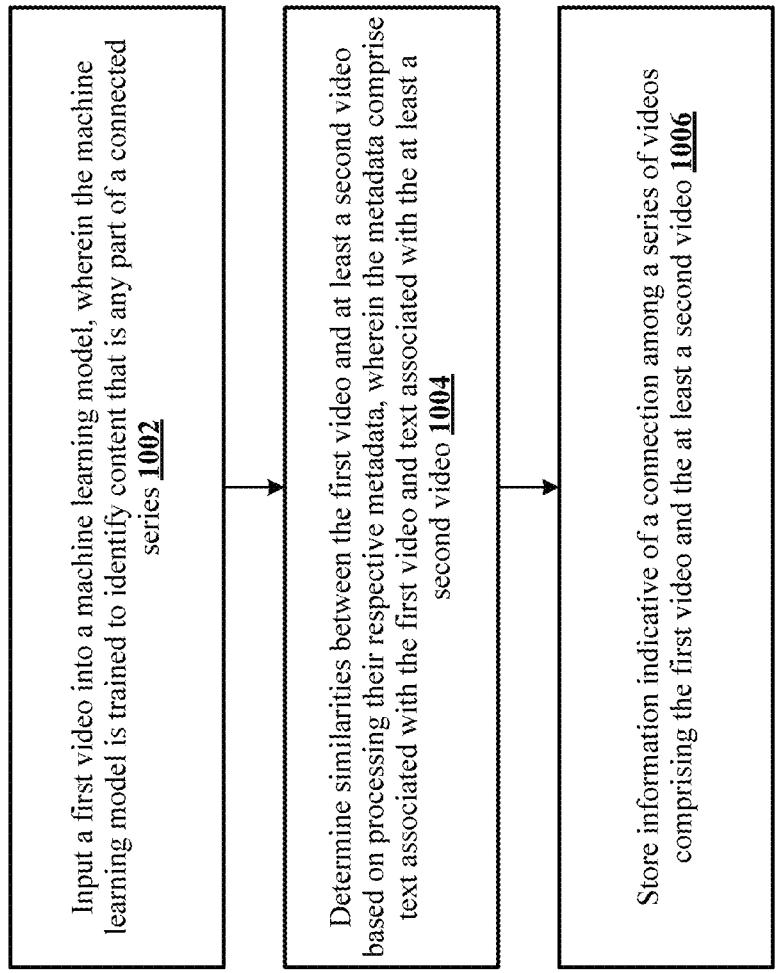
FIG. 10 shows another example method for automatically identifying video series which may be in accordance with the present disclosure.

FIG. 10 illustrates an example process 1000 performed by a video service (e.g., video service 112) and/or a client device (e.g., client device 104). The video service and/or the client device may perform the process 1000 automatically generate music for videos. Although depicted as a sequence of operations in FIG. 10, those of ordinary skill in the art will appreciate that various embodiments may add, remove, reorder, or modify the depicted operations.

At 1002, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 1004, similarities between the first video and at least a second video may be determined based on processing their respective metadata. For example, the metadata may comprise text associated with the first video and text associated with the at least a second video.

A machine learning model may, for example, comprise an extraction component, a data cleaning component, a frequency-inverse document frequency (TF-IDF) component, and/or a mining component. The extraction component may extract information, such as data and/or metadata, associated with the text associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for each video and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 1006, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series.

Figure 11:
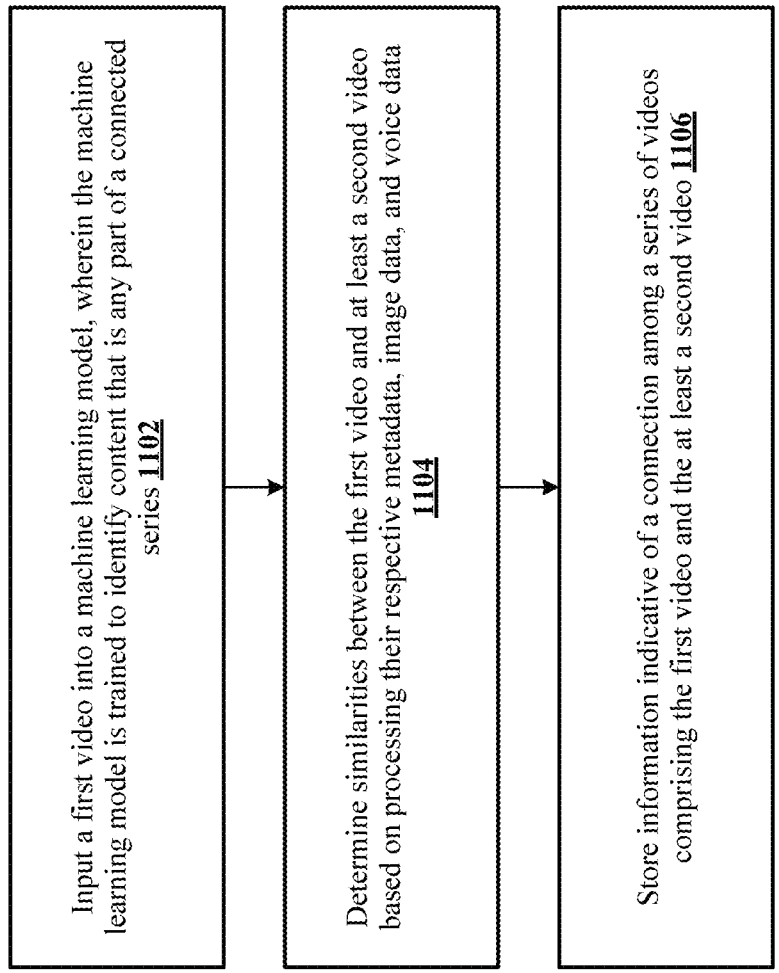
FIG. 11 shows another example method for automatically identifying video series which may be in accordance with the present disclosure.

FIG. 11 illustrates an example process 1100 performed by a video service (e.g., video service 112) and/or a client device (e.g., client device 104). The video service and/or the client device may perform the process 1100 automatically generate music for videos. Although depicted as a sequence of operations in FIG. 11, those of ordinary skill in the art will appreciate that various embodiments may add, remove, reorder, or modify the depicted operations.

At 1102, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 1104, similarities between the first video and at least a second video may be determined based on processing their respective metadata, image data, and voice data. For example, the metadata may comprise text associated with the first video and text associated with the at least a second video.

A machine learning model may, for example, comprise an extraction component, a data cleaning component, a frequency-inverse document frequency (TF-IDF) component, and/or a mining component. The extraction component may extract information, such as data and/or metadata, associated with the text associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word, term, image, and/or sound occurs in the cleaned data for each video and to determine how frequently that same word, term, image, and/or sound occurs in in a collection or corpus, such as in all videos uploaded to the video service. It may be determined that a word, term, image, and/or sound is more unique and/or is important to a particular video if the word, term, image, and/or sound is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the words, terms, images, and/or sounds that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 1106, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series.

Figure 12:
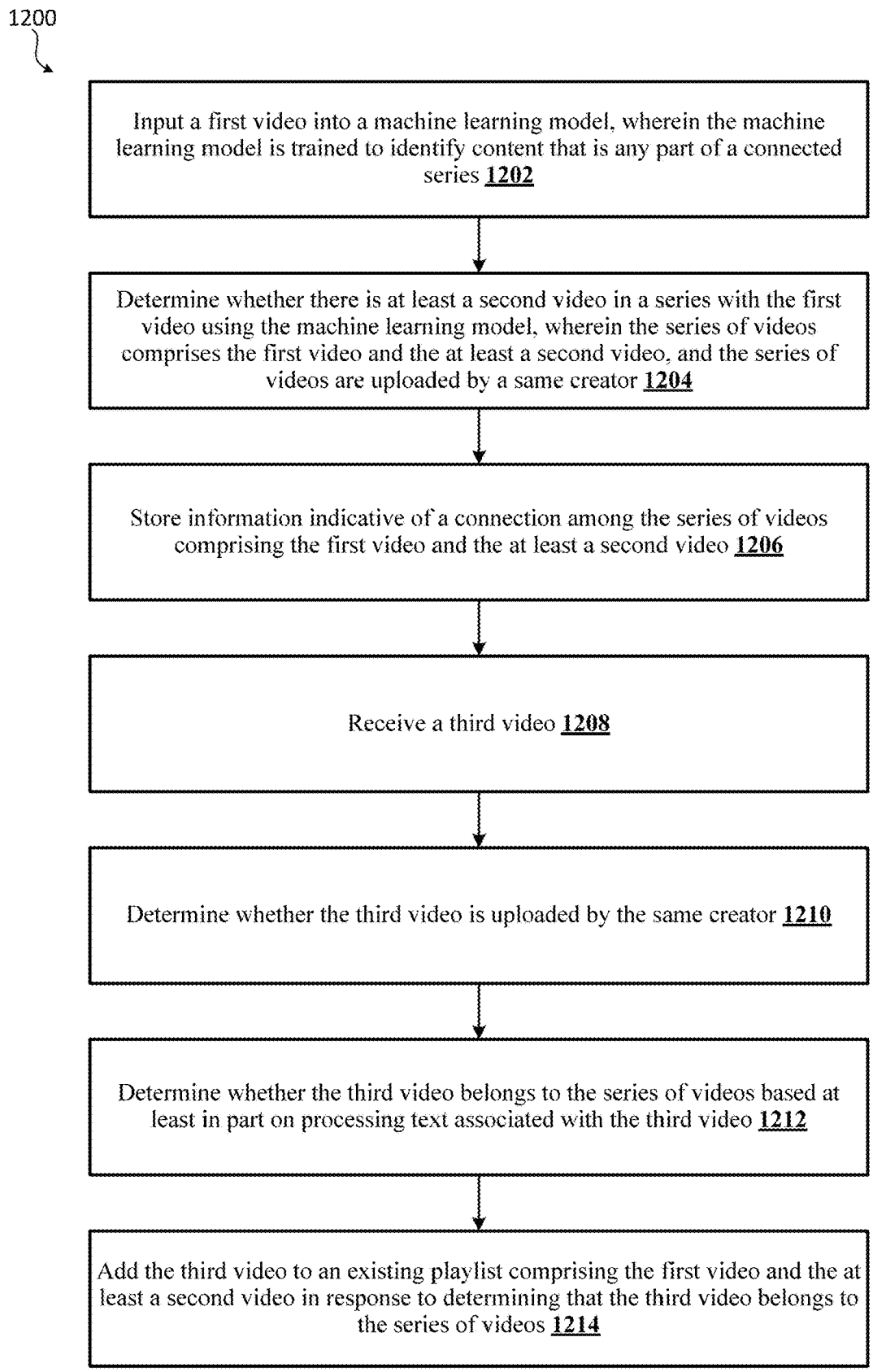
FIG. 12 shows another example method for automatically identifying video series which may be in accordance with the present disclosure.

FIG. 12 illustrates an example process 1200 performed by a video service (e.g., video service 112) and/or a client device (e.g., client device 104). The video service and/or the client device may perform the process 1200 automatically generate music for videos. Although depicted as a sequence of operations in FIG. 12, those of ordinary skill in the art will appreciate that various embodiments may add, remove, reorder, or modify the depicted operations.

At 1202, a first video may be input into a machine learning model. The machine learning model may be trained to identify content that is any part of a connected series. The video may, for example, be a video that was just created and uploaded to the video service. Alternatively, the video may be a video that was created and uploaded to the video service in the past, such as yesterday, last week, last month, etc.

The machine learning model may be configured to automatically determine video series. For example, when a new video is uploaded to the video service, the machine learning model may be configured to automatically identify other videos, if any, that belong to the same series as the first video. At 1204, it may be determined whether there is at least a second video in a series with the first video using the machine learning model. The series of videos may comprise the first video and the at least a second video. The series of videos may be uploaded by a same creator.

The machine learning model may, for example, comprise an extraction component, a data cleaning component, a frequency-inverse document frequency (TF-IDF) component, and/or a mining component. The extraction component may extract information, such as data and/or metadata, associated with the text, images, audio and/or subtitles associated with the first video and all other videos uploaded by the same creator. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for each video and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Videos related to the first video, if any, may be determined based on cosine similarity distance between the first video and the other videos. For example, the TF-IDF component may, for the first video and for each of the other videos uploading by the same creator, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the first video and all of the other vectors of TF-IDF tokens to determine videos that are related to the first video.

The mining component may utilize the video labels associated with the related videos to determine which of the related videos, if any, are likely connected in a series to the first video. For example, if the first video includes a label "part one," the mining component may determine that a related video including the label "part two" is likely connected in a series to the first video. The mining component may additionally explore video linkage based on the labels and/or the create times of the videos.

The mining component may determine that at least a second video is connected in series to the first video. At 1206, information indicative of a connection among the series of videos comprising the first video and the at least a second video may be stored, such as in a database. The information may indicate, for each video in the series whether it is the next video in the series or the previous video in the series if the similarity/confidence scores are high (i.e., satisfy a threshold). If the similarity/confidence scores are not high (i.e., do not satisfy a threshold), the information may indicate that the videos are recommended videos, without necessarily indicating the order of those videos in a series.

At 1208, a third video may be received. The third video may be a video that was just created and uploaded to the video service. Alternatively, the third video may be a video that was created and uploaded to the video service in the past, such as yesterday, last week, last month, etc. At 1210, it may be determined whether the third video is uploaded, such as to the video service, by the same creator as the first and second videos. If it is determined that the third video is not uploaded by the same creator as the first and second videos, the method may terminate, as the third video likely does not belong to the same series of videos as the first and second videos.

If it is determined that he third video is uploaded by the same creator as the first and second videos, the method may proceed to step 1212. At 1212, it may be determined whether the third video belongs to the series of videos based at least in part on processing text associated with the third video. For example, to determine whether the third video belongs to the series of videos, the third video may be fed into the machine learning model.

As described above, the extraction component of the machine learning model may extract information, such as data and/or metadata, associated with the text, images, audio and/or subtitles associated with the third video, as well as the first and second videos. As described above, the text associated with a video may include, by way of example and without limitation, a username associated with the video, a caption associated with the video, one or more hashtags associated with the video, video comments, and/or stickers featured in the video. A sticker may be an image, graphic, GIF, etc. that a user has superimposed on top of a video. The image may feature one or more letters or words.

The data cleaning component of the machine learning model may clean the extracted data/metadata. For example, the data cleaning component may prepare the extracted data/metadata for natural language processing. For example, as described above, the data cleaning component may remove symbols (i.e., @username), remove non-alphanumeric characters, convert uppercase text to lowercase text, convert video text and sticker text to words, and/or extract labels from the extracted data/metadata.

The TF-IDF component may be utilized, at least in part, to determined related videos based on the cleaned data. The TF-IDF component may be configured to determine how frequently a word or term occurs in the cleaned data for the first, second, and third videos and to determine how frequently that same word or term occurs in in a collection or corpus, such as in all videos uploaded to the video service. It may be determined that a word or term is more unique and/or is important to a particular video if the word or term is used frequently in the video and infrequently in all other videos uploaded to the video service.

Whether the third video is related to the first and second videos may be determined based on cosine similarity distance between the third video and the first and/or second videos. For example, the TF-IDF component may, for the first, second and third videos, determine a vector of TF-IDF tokens. The vector of TF-IDF tokens associated with a particular video may indicate the terms and/or words that are more unique and/or important to that particular video. The TF-IDF component may determine the cosine similarity distance between the vector associated with the third video and the vectors associated with the first and second videos to determine if the third video is related to the first and/or second video.

If it is determined that the third video is related to the first and/or second video, the mining component may utilize the video labels associated with the third, first and second videos to determine if the third video is likely connected in a series to the first and second video. For example, if the first video includes a label "part one" and the second video includes a label "part two," the mining component may determine that the third video including the label "part three" is likely connected in a series to the first video and the second video. The mining component may additionally explore video linkage based on the labels and/or the create times of the videos. At 1214, the third video may be added to an existing playlist comprising the first video and the at least a second video in response to determining that the third video belongs to the series of videos.

Figure 13:
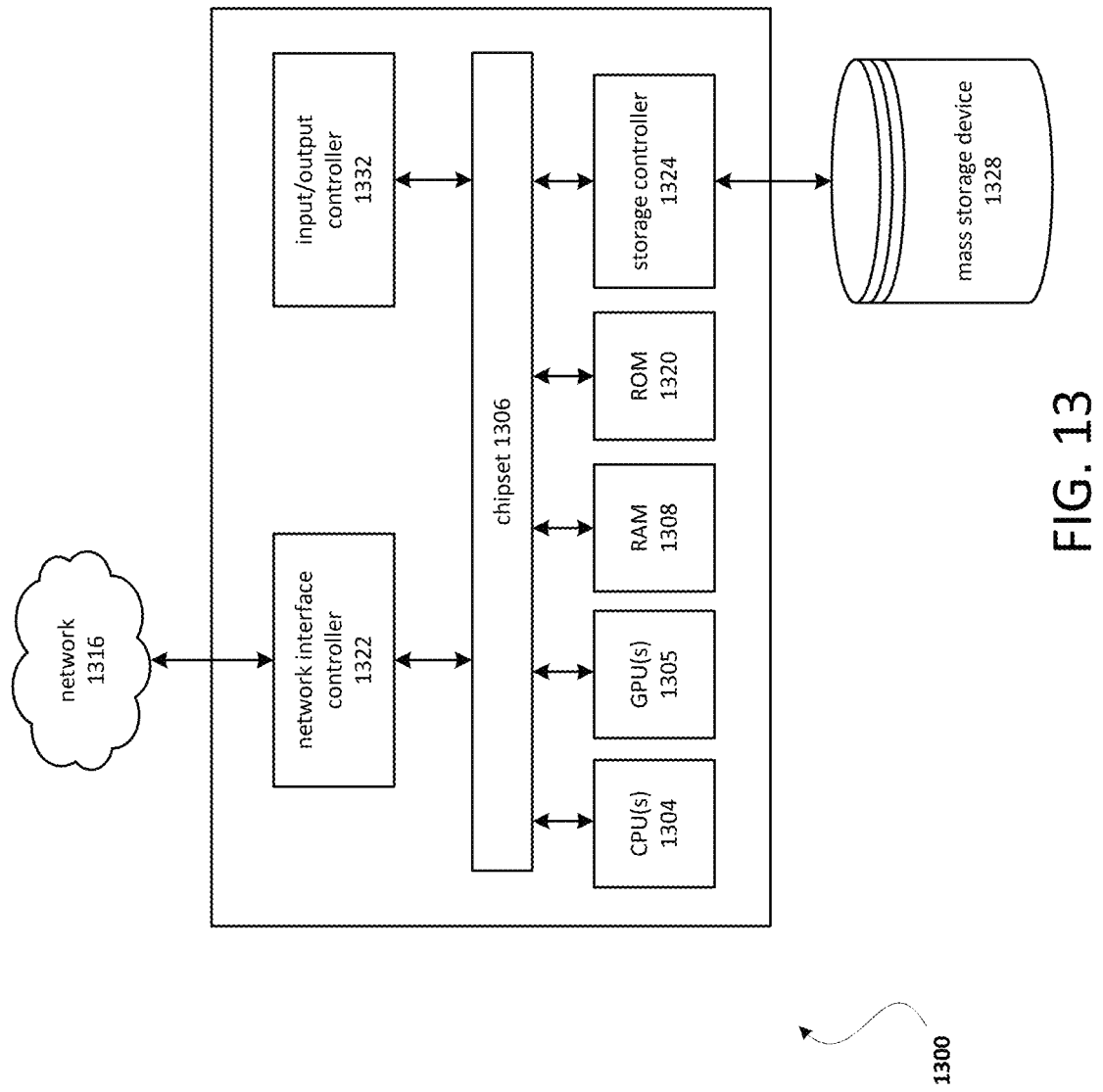
FIG. 13 shows an example computing device which may be used to perform any of the techniques disclosed herein.

FIG. 13 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s). The GPU(s) may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random-access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN). The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. The mass storage device 1328 may comprise a management component 1310. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on the mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described above. The computing device 1300 may have access to computer-readable storage media storing computer-executable instructions, which, when executed by the computing device 1300, may perform the methods described herein.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving content distribution on a content platform using a trained machine learning model, comprising:

inputting a first video created by a user into a machine learning model, wherein the machine learning model is trained to identify any other video created by a same user that belongs to a same series as an input video, wherein the user is any user on the content platform, and wherein the content platform comprises a plurality of videos distributed to a plurality of client computing devices;

extracting data from the first video and from a subset of the plurality of videos by the machine learning model, wherein the subset of the plurality of videos comprise videos created by the same user;

computing vectors associated with the first video and the subset of the plurality of videos by the machine learning model based on the data, wherein each vector indicates information that is unique to a particular video corresponding to each vector;

determining at least a second video related to the first video by the machine learning model based on the vectors, wherein the at least a second video is among the subset of the plurality of videos on the content platform;

determining whether the at least a second video is connected in a series with the first video based at least in part on creation times of the first video and the at least a second video using the machine learning model, wherein the series of videos comprises the first video and the at least a second video;

storing information indicative of a connection among the series of videos comprising the first video and the at least a second video; and causing to display an interface element indicative of the series of videos in an interface of playing any video in the series of videos on one of the plurality of client computing devices associated with a user who is viewing the any video in the series of videos, wherein the interface element is configured to enable the user to seamlessly view another video in the series of videos, and wherein the interface of playing the any video in the series of videos further comprises information indicating that the any video is a particular part of the series of videos.

2. The method of claim 1, further comprising:
generating a playlist, wherein the playlist comprises identification information of the first video and identification information of the at least a second video.

3. The method of claim 2, further comprising:
transmitting the playlist to the one of the plurality of client computing devices associated with the user who is viewing any video in the series of videos.

4. The method of claim 1, further comprising:
recommending one or more other videos in the series of videos to a user in response to detecting that the user is viewing any video in the series of videos.

5. The method of claim 1, further comprising:
determining similarities between the first video and the at least a second video based on processing their respective metadata, wherein the metadata comprise text associated with the first video and text associated with the at least a second video.

6. The method of claim 5, wherein the metadata further comprise information indicating creation time of the first video and information indicating creation time of the at least a second video.

7. The method of claim 1, further comprising:
determining similarities between the first video and the at least a second video based on processing their respective metadata, image data, and voice data.

8. The method of claim 1, further comprising:
receiving a third video;
determining whether the third video is uploaded by the same creator; and
determining whether the third video belongs to the series of video based at least in part on processing text associated with the third video.

9. The method of claim 8, further comprising:
adding the third video to an existing playlist comprising the first video and the at least a second video in response to determining that the third video belongs to the series of videos.

10. A system of improving content distribution on a content platform using a trained machine learning model, comprising:
at least one computing device in communication with a computer memory, the computer memory comprising computer-readable instructions that upon execution by the at least one computing device, configure the system to perform operations comprising:
inputting a first video created by a user into a machine learning model, wherein the machine learning model is trained to identify any other video created by a same user that belongs to a same series as an input video, wherein the user is any user on the content platform, and wherein the content platform comprises a plurality of videos distributed to a plurality of client computing devices;
extracting data from the first video and from a subset of the plurality of videos by the machine learning model, wherein the subset of the plurality of videos comprise videos created by the same user;
computing vectors associated with the first video and the subset of the plurality of videos by the machine learning model based on the data, wherein each vector indicates information that is unique to a particular video corresponding to each vector;
determining at least a second video related to the first video by the machine learning model based on the vectors, wherein the at least a second video is among the subset of the plurality of videos on the content platform;
determining whether the at least a second video is connected in a series with the first video based at least in part on creation times of the first video and the at least a second video using the machine learning model, wherein the series of videos comprises the first video and the at least a second video;
storing information indicative of a connection among the series of videos comprising the first video and the at least a second video; and
causing to display an interface element indicative of the series of videos in an interface of playing any video in the series of videos on one of the plurality of client computing devices associated with a user who is viewing the any video in the series of videos, wherein the interface element is configured to enable the user to seamlessly view another video in the series of videos, and wherein the interface of playing the any video in the series of videos further comprises information indicating that the any video is a particular part of the series of videos.

11. The system of claim 10, the operations further comprising:
generating a playlist, wherein the playlist comprises identification information of the first video and identification information of the at least a second video; and
transmitting the playlist to the one of the plurality of client computing devices associated with the user who is viewing any video in the series of videos.

12. The system of claim 10, the operations further comprising:
recommending one or more other videos in the series of videos to a user in response to detecting that the user is viewing any video in the series of videos.

13. The system of claim 10, the operations further comprising:
determining similarities between the first video and the at least a second video based on processing their respective metadata, wherein the metadata comprise text associated with the first video and text associated with the at least a second video.

14. The system of claim 13, wherein the metadata further comprise information indicating creation time of the first video and information indicating creation time of the at least a second video.

15. The system of claim 10, the operations further comprising:
receiving a third video;
determining whether the third video is uploaded by the same creator; and
determining whether the third video belongs to the series of video based at least in part on processing text associated with the third video; and adding the third video to an existing playlist comprising the first video and the at least a second video in response to determining that the third video belongs to the series of videos.

16. A non-transitory computer-readable storage medium, storing computer-readable instructions that upon execution by a processor cause the processor to implement operations comprising:
  inputting a first video created by a user into a machine learning model, wherein the machine learning model is trained to identify any other video created by a same user that belongs to a same series as an input video, wherein the user is any user on the content platform, and wherein the content platform comprises a plurality of videos distributed to a plurality of client computing devices;
  extracting data from the first video and from a subset of the plurality of videos by the machine learning model, wherein the subset of the plurality of videos comprise videos created by the same user;
  computing vectors associated with the first video and the subset of the plurality of videos by the machine learning model based on the data, wherein each vector indicates information that is unique to a particular video corresponding to each vector;
  determining at least a second video related to the first video by the machine learning model based on the vectors, wherein the at least a second video is among the subset of the plurality of videos on the content platform;
  determining whether the at least a second video is connected in a series with the first video based at least in part on creation times of the first video and the at least a second video using the machine learning model, wherein the series of videos comprises the first video and the at least a second video;
  storing information indicative of a connection among the series of videos comprising the first video and the at least a second video; and
  causing to display an interface element indicative of the series of videos in an interface of playing any video in the series of videos on one of the plurality of client computing devices associated with a user who is viewing the any video in the series of videos, wherein the interface element is configured to enable the user to seamlessly view another video in the series of videos, and wherein the interface of playing the any video in the series of videos further comprises information indicating that the any video is a particular part of the series of videos.

17. The non-transitory computer-readable storage medium of claim 16, the operations further comprising:
  generating a playlist, wherein the playlist comprises identification information of the first video and identification information of the at least a second video; and
  transmitting the playlist to the one of the plurality of client computing devices associated with the user who is viewing any video in the series of videos.

18. The non-transitory computer-readable storage medium of claim 16, the operations further comprising:
  recommending one or more other videos in the series of videos to a user in response to detecting that the user is viewing any video in the series of videos.

19. The non-transitory computer-readable storage medium of claim 16, the operations further comprising:
  determining similarities between the first video and the at least a second video based on processing their respective metadata, wherein the metadata comprise text associated with the first video and text associated with the at least a second video.

20. The non-transitory computer-readable storage medium of claim 16, the operations further comprising:
  receiving a third video;
  determining whether the third video is uploaded by the same creator; and
  determining whether the third video belongs to the series of video based at least in part on processing text associated with the third video; and
  adding the third video to an existing playlist comprising the first video and the at least a second video in response to determining that the third video belongs to the series of videos.

* * * * *